(12) United States Patent
Dolan (10) Patent No.: US 11,808,582 B1
(45) Date of Patent: Nov. 7, 2023

(54) SYSTEM PROCESSING SCENARIO OBJECTS DURING SIMULATION

(71) Applicant: Zoox, Inc., Foster City, CA (US)

(72) Inventor: James Graham Dolan, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 178 days.

(21) Appl. No.: 17/305,090

(22) Filed: Jun. 30, 2021

(51) Int. Cl.
*G01C 21/32* (2006.01)
*G01C 21/36* (2006.01)

(52) U.S. Cl.
CPC ......... *G01C 21/32* (2013.01); *G01C 21/3638* (2013.01)

(58) Field of Classification Search
CPC ............................. G01C 21/32; G01C 21/3638
See application file for complete search history.

(56) References Cited

U.S. PATENT DOCUMENTS

| | | | | |
|---|---|---|---|---|
| 2014/0368493 | A1* | 12/2014 | Rogan | G01S 17/50 345/419 |
| 2017/0371338 | A1* | 12/2017 | Kamata | G05D 1/0274 |
| 2019/0384309 | A1* | 12/2019 | Silva | G01S 17/931 |
| 2022/0413502 | A1* | 12/2022 | Keski-Valkama | G05D 1/0088 |

\* cited by examiner

*Primary Examiner* — Anshul Sood
*Assistant Examiner* — Matthew Ho
(74) *Attorney, Agent, or Firm* — Lee & Hayes, P.C.

(57) ABSTRACT

Techniques associated with improving performance and realism of simulation instances associated with simulation testing of autonomous vehicles. In some cases, a simulation system may be configured to run a pre-simulation test to identify and store occlusion data to improve the performance of subsequent simulations associated with a shared scene or route.

20 Claims, 9 Drawing Sheets

SYSTEM PROCESSING SCENARIO OBJECTS DURING SIMULATION

BACKGROUND

Autonomous vehicles may define and navigate along routes without the assistance of a human driver. Various systems have been developed to assist with testing, updating, and maintaining operational software and hardware of the autonomous vehicles to ensure safety and reliability prior to deployment of the vehicles. However, the testing software often produces large amounts of resultant data that is difficult for a human to parse and review.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Autonomous vehicles may navigate through physical environments along planned routes or paths. For example, when an autonomous vehicle receives a request to travel to a destination location, the autonomous vehicle may navigate along a planned path from the current location of the autonomous vehicle to a pickup location to pick up a passenger and then from the pickup location to the destination location. While navigating, the autonomous vehicle may encounter dynamic (e.g., vehicles, pedestrians, animals, and the like) and/or static (e.g., buildings, signage, parked vehicles, and the like) objects in the environment. In order to ensure the safety of the occupants and objects, the decisions and reactions of the autonomous vehicles to events and situations that the vehicle may encounter can be modeled and simulated using a plurality of scenarios defined and output by a scenario generation system and executed by a simulation system. Individual scenarios and/or simulation instances may include a number of dynamic objects as well as a number of static objects.

In some cases, the scenarios may be generated from log data captured by operating vehicles. For example, the scenario may be generated using map data and static objects identified within the log data. Dynamic objects may then be inserted, placed, and/or arranged with respect to the static objects to test the vehicle under various conditions and parameters. As multiple scenarios with varying dynamic objects may be executed with respect to the same or similar trajectories (e.g., different lanes along the same route), the system, discussed herein, may reduce the overall run time and resource consumption associated with the multiple scenarios by executing a pre-simulation scenario without the presence of dynamic objects in order to cache or otherwise store data (such as position, height, transparency, and the like) for the static objects. The occlusion data associated with the static objects may then be accessed during execution of the remaining scenarios based, on for instance, distance from the simulated vehicle. In this manner, the system described herein, may improve the overall run time associated with testing multiple scenarios as the static objects may be accessed via look up and are not calculated for each individual scenario. In some specific examples, by pre-storing or caching the occlusion data and/or static object data, the system may execute the scenarios as a two-dimensional simulation opposed to a three-dimension simulation further reducing the executing time and resources consumption with respect to conventional simulation systems. For example, the pre-simulation may be executed in three-dimensions to provide more accurate and/or complete object data and/or occlusion data. The remaining simulations may then be executed in two-dimensions to reduce run time and resource consumption. In this manner, the system may reduce the three-dimensional simulations to a single simulation per route or set of scenarios.

Additionally, often within the log data a static objects may be fully or partially occluded by a dynamic actor in the physical environment at the time the log data is generated by the operating vehicle. For example, a bus or large automobile may be traveling next to or adjacent to the autonomous vehicle generating the log data. In this example, the bus or large automobile may occlude the sensors of the autonomous vehicle and, as such, leave a gap in the log data (e.g., the log data does not represent objects behind or occluded by the bus). However, in simulations in which the vehicle diverges from the log data (e.g., the vehicle is no longer next to the bus or large automobile), the system may fill or model the gaps caused by the occlusion in the log data (e.g., the system may insert static objects, synthetic scene data, and the like). In this manner, the subsequent simulations are prevented from presenting the vehicle with objects that the vehicle is unable to sense. Unfortunately, this results in the gaps being filled for each three-dimensional simulation instance at run time, which is expensive in terms of computing resources. Additionally, filling gaps at run time often results in a delay or increased test time, thereby reducing the number of simulations completed during a given period of time.

As such, the simulation system, discussed herein, may for a given route or set of routes, run a three-dimensional simulation once without the presence of dynamic objects prior to executing a plurality of scenarios associated with the route but that differ with respect to parameters of dynamic objects and/or the vehicle. The system may, during the first simulation, identify and cache positions of the static objects as well as fill any gaps with respect to the static objects in the scenario. The remaining scenarios may then be run in two-dimensions using a look up of the cached occlusion data (e.g., static object data, visibility data, and the like).

In one specific example, the system may cache or store the position data of the static objects as an occupancy grid. For example, occupancy may be determined based on predetermined physical size, such as a 5 cm square. The occupancy may also be determined in three-dimensions to determine and store a height value and/or a bounding box of the region associated with of the static objects. For instance, in some cases, the vehicle may be able to see over a static object (such as a bench, shrub, hedge, or the like). In these instances, the static object may only partially occlude the vehicle's sensors and may be ignored in some simulations.

Although examples are described in the context of autonomous vehicles, the techniques described herein are not limited to use with autonomous vehicles and may be used to generate and identify simulations for use with other scenarios, such as other types of vehicles (e.g., autonomous, semi-autonomous, or manually driven land vehicles, watercraft, aircraft, spacecraft, etc.), automated manufacturing, video games, etc.

Figure 1:
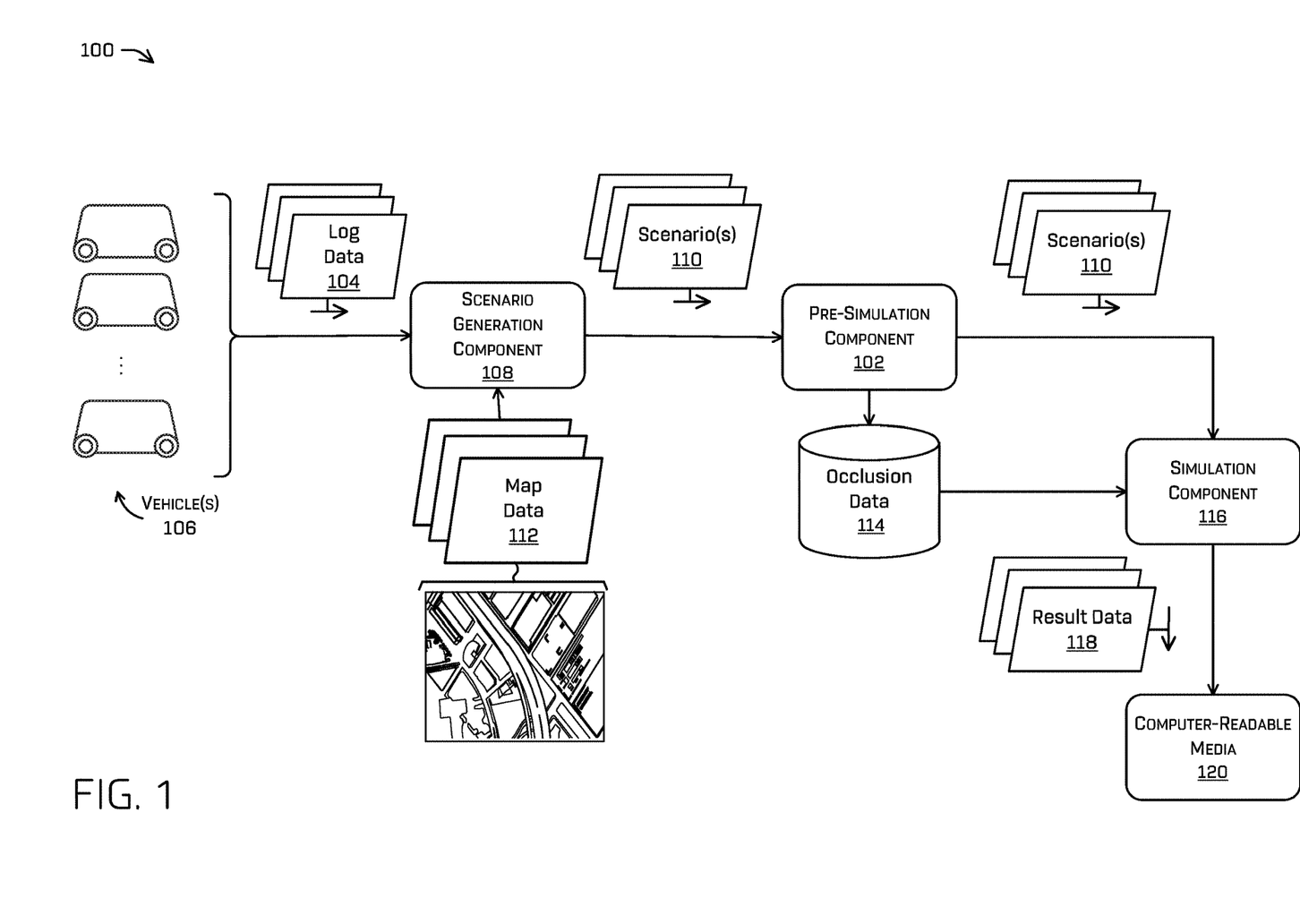
FIG. 1 illustrates an example block diagram illustrating an example architecture of a scenario generation and simulation system comprising a pre-simulation component, in accordance with implementations of the disclosure.

FIG. 1 is an example block-diagram illustrating an example architecture of a scenario generation and simulation system 100 comprising a pre-simulation component 102, in accordance with implementations of the disclosure. As discussed above, synthetic scenario generation for use with simulation, modeling, and testing autonomous vehicles systems and software may assist with improving overall operations of the autonomous vehicles when encountering new or unexpected situations. In the current example, log data 104 may be received from one or more vehicles 106 operating on various roadways in real world conditions and environments. As discussed above the log data 104 may include sensor data, perception data, prediction data, trajectory information, and the like, and in some cases the log data 104 may be incomplete or occluded by various real dynamic objects at the time of capture. For example, details associated with the categorizing of results and/or triage component may be discussed in U.S. application Ser. No. 16/457,679 entitled "Synthetic Scenario Generator Based on Attributes", which is herein incorporated by reference in its entirety for all purposes.

In this example, the log data 104 may be processed by a scenario generation component 108, which may output scenarios 110 based on the log data 104 as well as map data 112. In some cases, the scenario generation component 108 may be configured to parse log data 104 received from one or more vehicles 106 based on a set time interval (e.g., every 40 milliseconds, every 80 milliseconds, every 200 milliseconds, etc.). For each time interval, the scenario generation component 108 may define regions, actors or objects, parameters of the actors or objects (e.g., speed, trajectory, initial position, etc.), and the like.

In some examples, the scenario generation component 108 may utilize parameters or states of objects extracted from the log data 104 to generate the simulation scenarios 110. In some examples, the scenario generation component 108 may be configured to receive as an input or otherwise access the map data 112 of actual roads and physical environments. The scenario generation component 108 may then fit the scenarios 110 and/or arrange representative objects based on corresponding parameters (velocity, distance from the vehicle, associated region, direction of travel or trajectory, etc.) to the map data 112, such that the scenarios 110 are determined feasible at the selected map location or environment. In other examples, the scenario generation component 108 may generate the scenarios 110 without relying on log data 104. For example, the scenarios and/or parameters of the scenarios may be generated synthetically. In some cases, the scenarios 110 (either based at least in part on the log data 104 and/or generated synthetically) may be fit to the map data 112, such that in some cases some scenarios 110 may be generated without relying on either the log data 104 or the map data 112.

In some examples, the scenarios 110 may be arranged as a set (e.g., multiple scenarios with different dynamic objects, conditions, and/or situations along a shared route, map, or physical environment) to test the autonomous vehicle's operations within a known route under varying parameters (such as multiple scenarios 110 with objects having perturbed positions, velocity, behavior, and the like). In the simulation system 100, discussed herein, the simulation system 100 may comprise the pre-simulation component 102. The pre-simulation component 102 may receive the scenarios 110 or the set of scenarios along a given route. The pre-simulation component 102 may execute a single pre-simulation scenario and/or simulation instance without the presence of dynamic objects to detect and store (e.g., cache) occlusion data 114 along the route. In some examples, the pre-simulation component 102 may execute less than a predetermined threshold number of simulation instances associated with the set of scenarios, in the cases in which the vehicle may have multiple routes to choose from (e.g., one instance for each potential route).

The scenarios 110 may then be provided to the simulation component 116 in order to generate, test, and/or execute simulations of various components and software of autonomous vehicles. In some cases, the simulation component 116 may execute the simulations in two dimensions and utilize the stored occlusion data 114 to determine the position and/or characteristics of the static objects along the route or routes. The simulation component 116 may generate result data 118 based on the outcome of each simulation instance. For example, the result data 118 may be generated based at least in part on the simulation component 116 executing various simulations using varying or different parameter data associated with the dynamic objects. For example, the simulation component 116 may vary the velocity, trajectory, initial position of various objects or agents within one or more of the scenarios 110. The simulation component 116 may output or otherwise generate result data 118 including the results of individual simulation instances as well as various flags related to the occurrence of particular events, such as an activation of one or more monitoring systems.

As an example, details associated with the scenario generation component 108 and the simulation component 116 may be discussed in U.S. application Ser. Nos. 16/866,715 entitled "System for Generating Generalized Simulation Scenarios", 16/586,838 entitled "Safety Analysis Framework", and 16/586,853 entitled "Error Modeling Framework", which are herein incorporated by reference in their entirety for all purposes. The result data 118 may be stored in a computer-readable media 120 for further human review and/or provided to a triage component for further categorization prior to human review. For example, details associated with the categorizing of results and/or triage component may be discussed in U.S. application Ser. No. 17/302,342 entitled "System for Identifying Simulation Scenarios", which is herein incorporated by reference in its entirety for all purposes.

Figure 2:
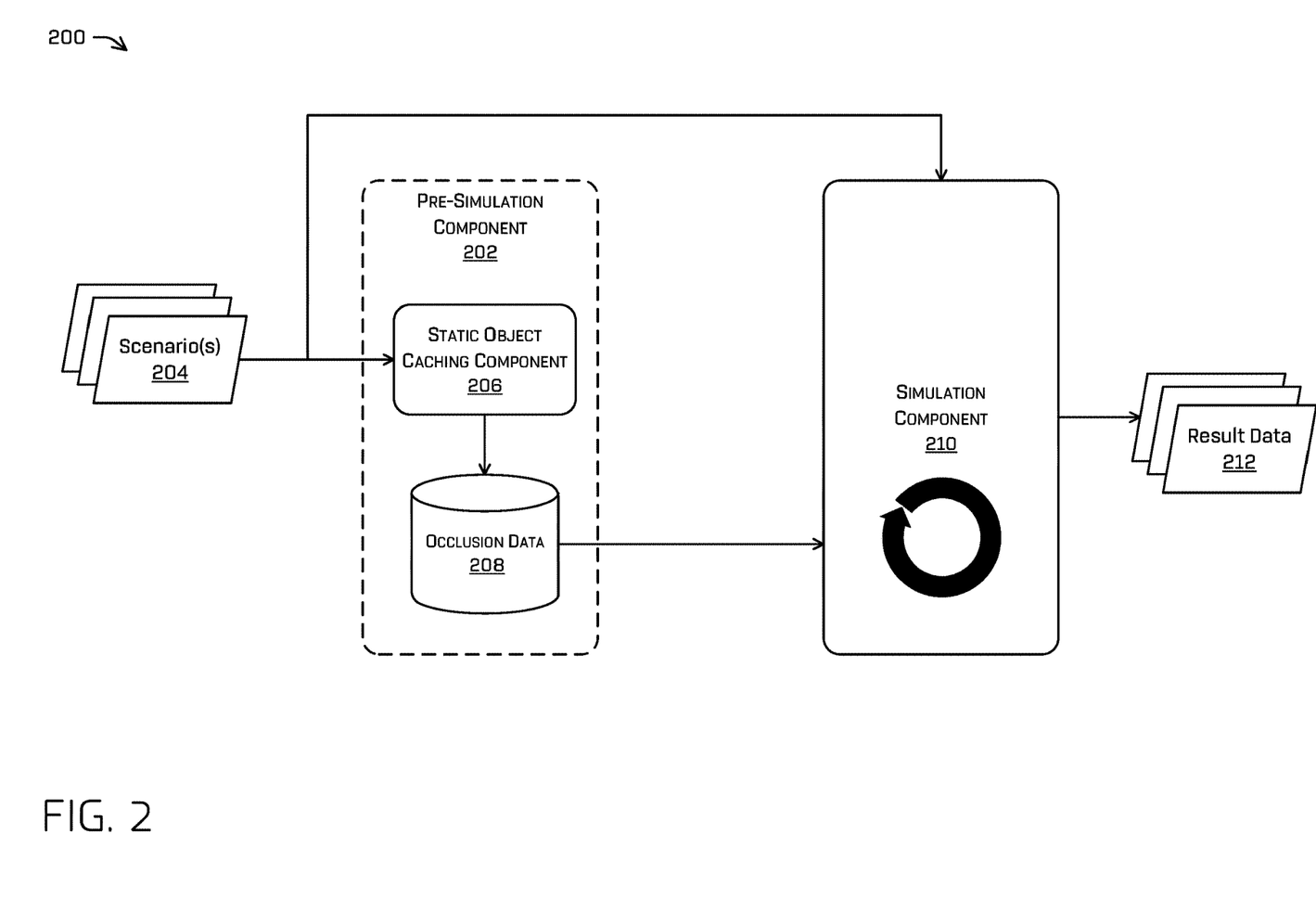
FIG. 2 illustrates another example block diagram illustrating an example architecture of a scenario generation and simulation system comprising a pre-simulation component, in accordance with implementations of the disclosure.

FIG. 2 illustrates another example block diagram illustrating an example architecture of a scenario generation and simulation system 200 comprising a pre-simulation component 202, in accordance with implementations of the disclosure. In the current example, the pre-simulation component 202 may receive a set of scenarios 204 or the set of scenarios associated with a given route. As discussed above, the set of scenarios 204 may be generated by a scenario generation system based on log data captured by autonomous vehicles operating within real life physical environments.

The pre-simulation component 202 may execute a three-dimensional pre-simulation scenario associated with the scenarios 204 without the presence of dynamic objects. A static object caching component 206 of the pre-simulation component 202 may identify and store position data, visibility data, and/or object data, generally indicated by occlusion data 208, associated with the static objects in a location accessible by a simulation component 210. In some cases, details associated with identifying and storing occlusion data 208, such as implemented by the static object caching component 206 may be discussed in U.S. Application Ser. No. 17/193,826 entitled "Instantiating Objects in a Simulated Environment Based On Log Data", which is herein incorporated by reference in its entirety for all purposes.

The scenarios 204 can also be received by the simulation component 210 in order to generate, test, and/or execute simulations of various components and software of autonomous vehicles. In some cases, the simulation component 210 may execute the simulations in two dimensions and access the stored occlusion data 208 to determine the position and/or characteristics of the static objects along the route or routes. The simulation component 210 may generate result data 212 based on the outcome and occurrences of each simulation instance. For example, the result data 212 may be generated based at least in part on the simulation component 210 executing various simulations using varying or different parameter data associated with the dynamic objects. For example, the simulation component 210 may vary the velocity, trajectory, initial position of various objects or agents within one or more of the scenarios 204. Again, the simulation component 210 may output or otherwise generate result data 212 including the results of individual simulation instances as well as various flags related to the occurrence of particular events.

FIGS. 3-6 are flow diagrams illustrating example processes associated with the simulation system discussed above. The processes are illustrated as a collection of blocks in a logical flow diagram, which represent a sequence of operations, some or all of which can be implemented in hardware, software, or a combination thereof In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the processes, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

Figure 3:
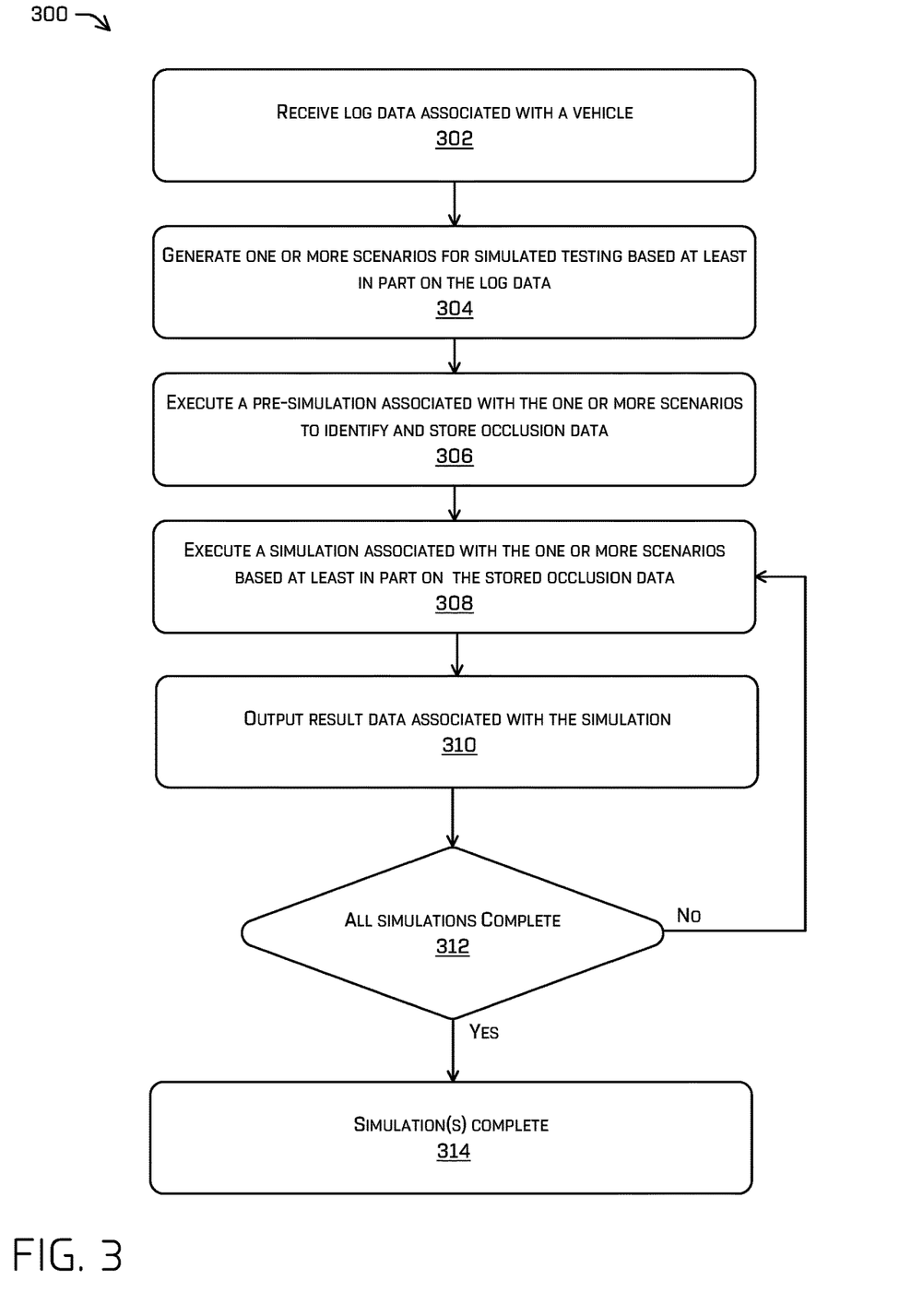
FIG. 3 is a flow diagram illustrating an example process associated with the pre-simulation component, in accordance with implementations of the disclosure.

FIG. 3 is a flow diagram illustrating an example process 300 associated with the pre-simulation component, in accordance with implementations of the disclosure. As discussed above, the pre-simulation component may be utilized to cache or otherwise store occlusion data and/or to fill gaps in a virtual scene being used for simulated testing of an autonomous vehicle's systems and process. For example, the gaps may be caused by sensor occlusions during log data capture and generation. By pre-caching the occlusion data, the simulation system may reduce the execution time of each simulation instance along a shared route or within a shared scene as the simulation system does not perform operations to determine occlusion data with respect to each simulation instance. In some specific examples, the scenario generation system may utilize the cached occlusion data associated with the static objects from the pre-simulation to update or generate additional scenarios for testing.

At 302, the simulation system may receive log data associated with a vehicle. For example, the log data may be captured and generated by an autonomous vehicle operating in a real world physical environment. In other examples, the log data and/or scene/environment associated with the route may be machine generated or otherwise syntenic test data. The log data may include the sensor data, perception data (e.g., classified and segmented objects), as well as characteristics of the segmented and classified objects.

At 304, the simulation system may generate one or more scenarios for simulated testing based at least in part on the log data. In some cases, multiple scenarios associated with a route may be generated using the log data and fit to map data. Each of the scenarios associated with the route may differ based on characteristics and positions of various dynamic objects within the scenarios and along the route. For example, the scenario generation component may perturb various parameters and/or features of dynamic objects (such as velocity, acceleration, direction of travel, and the like) to generate similar conditions or scenarios that may be tested.

At 306, the simulation system may execute a pre-simulation scenario associated with the one or more scenarios to generate, identify, and/or store static data. For example, the pre-simulation may be executed without the presence of dynamic objects, such that the simulation system may identify and store the position and characteristics of static objects and environment features (such as buildings, benches, plants, parked cars, and the like). The simulation system may also identify any gaps in the scene caused by occlusion within the sensor data of the log data used to generate the one or more scenarios and fill them in. In this manner, the simulation system may prevent issues and/or errors during testing caused by deviations between the virtual test vehicle (such as lane changes, relative position of dynamic objects, vehicle velocity, altered environmental conditions, and the like) and the operating vehicle that collected the log data, as discussed above.

In some cases, the simulation system may execute a pre-simulation scenario with respect to two or more routes associated with a scene or environment. For example, the route may be perturbed and/or the occlusion data may be cached from various positions within the environment. In this manner, the occlusion data may be used in subsequent simulations even when the vehicle deviates from a predetermined route by more than a threshold distance (such as changing lanes, making a U-turn, re-routing along a parallel roadway, and the like). In some specific cases, the pre-simulation may cache the occlusion data from perspectives or points of view that are unrealistic and/or unattainable by the vehicle to further complete the scene with respect to deviations from the predetermined route during subsequent simulations.

At 308, the simulation system may execute simulations associated with the one or more scenarios based at least in part on the stored occlusion data. For example, each of the simulations and/or scenarios may be associated with a route having differing conditions and dynamic objects.

At 310, the simulation system may output result data associated with the simulation. In some examples, the result data may include one or more flags, such as flags indicating that one or more systems were engaged or activated (e.g., collision avoidance system, road or lane monitoring systems, and the like), a total time of execution (e.g., how long it took the vehicle to complete the planned route), various metrics (e.g., number of lane changes, minimum and maximum velocity, minimum and maximum acceleration, minimum and maximum distances of other agents to the vehicle), any fault states of the vehicle or the simulation component, and the like.

At 312, the simulation system may determine if all simulations are complete. If so, then the process 300 may advance to 314. Otherwise, the process 300 may return to 308 and the simulation system may execute additional simulations.

Figure 4:
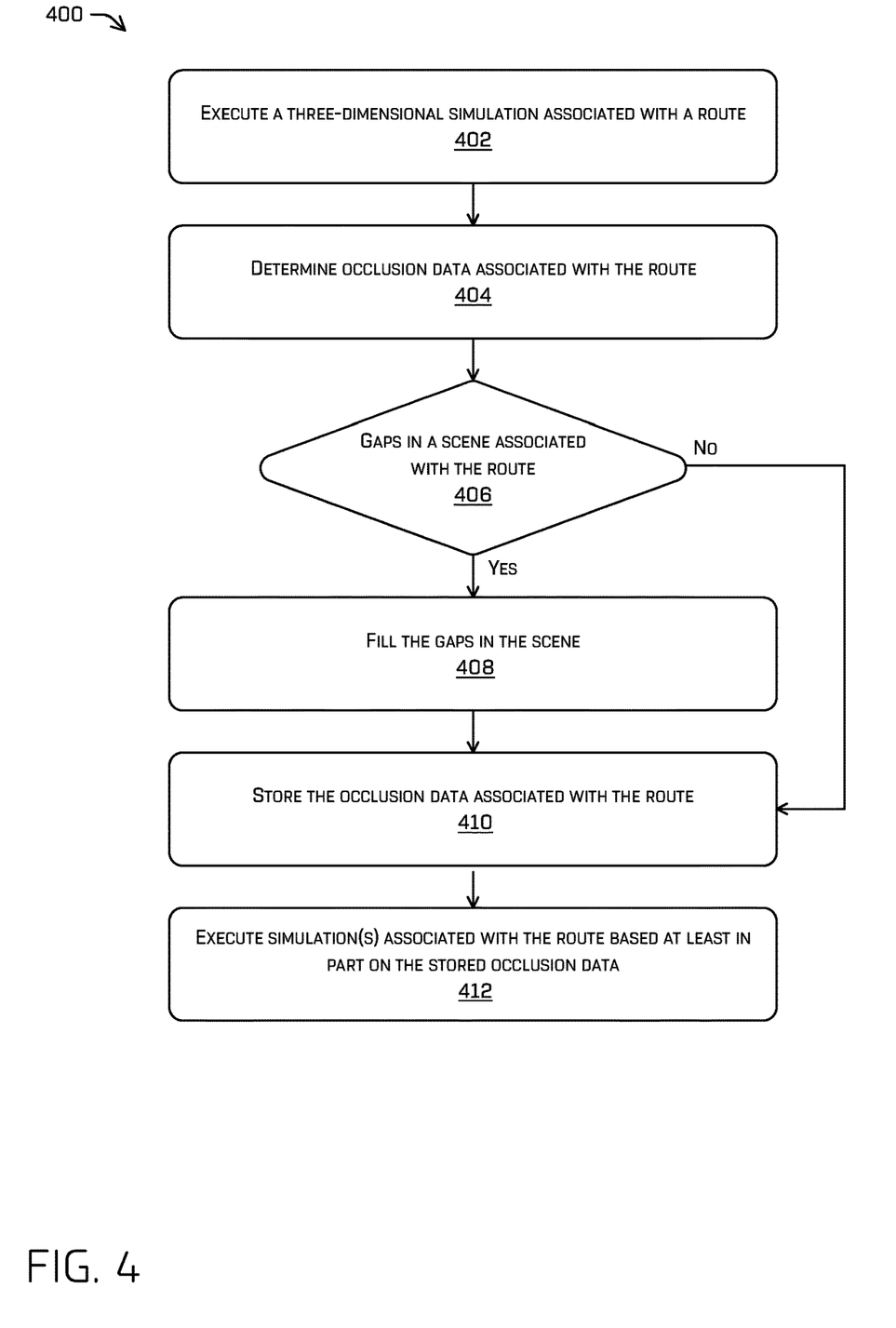
FIG. 4 is a flow diagram illustrating an example process associated with the pre-simulation component, in accordance with implementations of the disclosure.

FIG. 4 is a flow diagram illustrating an example process 400 associated with the pre-simulation component, in accordance with implementations of the disclosure. As discussed above, a pre-simulation component may be utilized to cache or otherwise store occlusion data and/or to fill gaps in a virtual scene being used for simulated testing of an autonomous vehicle's systems and process. Again, by pre-caching and looking up the occlusion data associated with a route, the simulation system may reduce the execution time of each simulation instance, as the simulation system does not perform operations to determine occlusion data with respect to each simulation instance.

At 402, the simulation system may execute a three-dimensional simulation associated with a route. For example, the simulation system may receive log data associated with an operating vehicle and generate, from the log data, one or more scenarios associated with the route. Each of the scenarios associated with the route may differ based on characteristics and positions of various dynamic objects along the route. In some cases, the scenarios may also represent different driving conditions, such as road conditions (e.g., material, damage, construction, and the like), weather (e.g., rain, hail, snow, and the like), and the like.

In some examples, the simulation system may execute the pre-simulation in three-dimensions to more precisely generate the occlusion data associated with the route or scene. For example, if the vehicle approaches a crest in a hill, the visibility and/or occasion associated with the hill may change as the vehicle moves closer to the apex of the crest. By modeling the simulation in three-dimensions the partial visibility over the crest may be more accurately determined than in a two dimensional simulation.

At 404, the simulation system may determine occlusion data associated with the route. For example, the initial three-dimensional simulation associated with the route may be executed with the absence of dynamic objects, such that the simulation system may identify and store the position and characteristics of static objects (such as buildings, benches, plants, parked cars, and the like). The static objects may be stationary in an environment that is being simulated and their respective positions may not change. In the current example, the initial simulation may be executed in three-dimensions. By executing the simulation in three-dimension, the characteristics of the static objects may be determined with respect to the location of the vehicle and/or positions of one or more sensors of the vehicle. For example, the simulation system may determine a height of the static object to determine if the vehicle can see over the object (such as a low bench or shrub). The three-dimensional simulation may also assist in determining a density or transparency associated with the static object. For instance, in some cases the vehicle may be able to see through or partially see through a canopy of a tree. Thus, in some cases, the simulation system may determine an occupancy grid associated with the static objects comprising percentage of occlusion or transparency associated with the static object. In some cases, the grid may include a physical space, such as a one centimeter by one centimeter cell or larger grid cells (e.g., one meter by one meter cell), a five meter by five meter cell, and the like.

At 406, the simulation system may determine if there are gaps in a scene associated with the route. If not the process may advance to 410. However, if there are gaps, the process 400 may proceed to 408. At 408, the simulation system may fill at least some of the gaps in the scene with generated static objects and/or other synthetic environmental data. For example, the gaps may be caused by occlusion within the sensor data of the log data used to generate the one or more scenarios along the route. In some cases, the simulation system may utilize one or more machine learned models or networks to fill the gaps in the scene. For instance, the system may input a portion of the scene into the machine learned model or network and receive as an output a filled region of the scene. In some cases, the machine learned models or networks may be trained using the log data.

At 410, the simulation system may store the occlusion data associated with the route. For example, the simulation system may store or cache the static object data in one or more look up tables that may be accessed by the simulation system during subsequent simulations associated with the route to reduce the overall computing resource consumption and time associated with simulated testing when compared with conventional test systems.

At 412, the simulation system may execute simulations associated with the route based at least in part on the stored occlusion data. In some cases, the simulation system may reduce the computation complexity of the simulation by operating in a two-dimensional simulation based at least in part on the occlusion data and static object look up. However, it should be understood that in other implementations the simulation system may execute the plurality of simulations in three-dimensions. Further it should also be understood that the each of the plurality of simulations may also represent different dynamic object data and/or different driving conditions, as discussed above.

Figure 5:
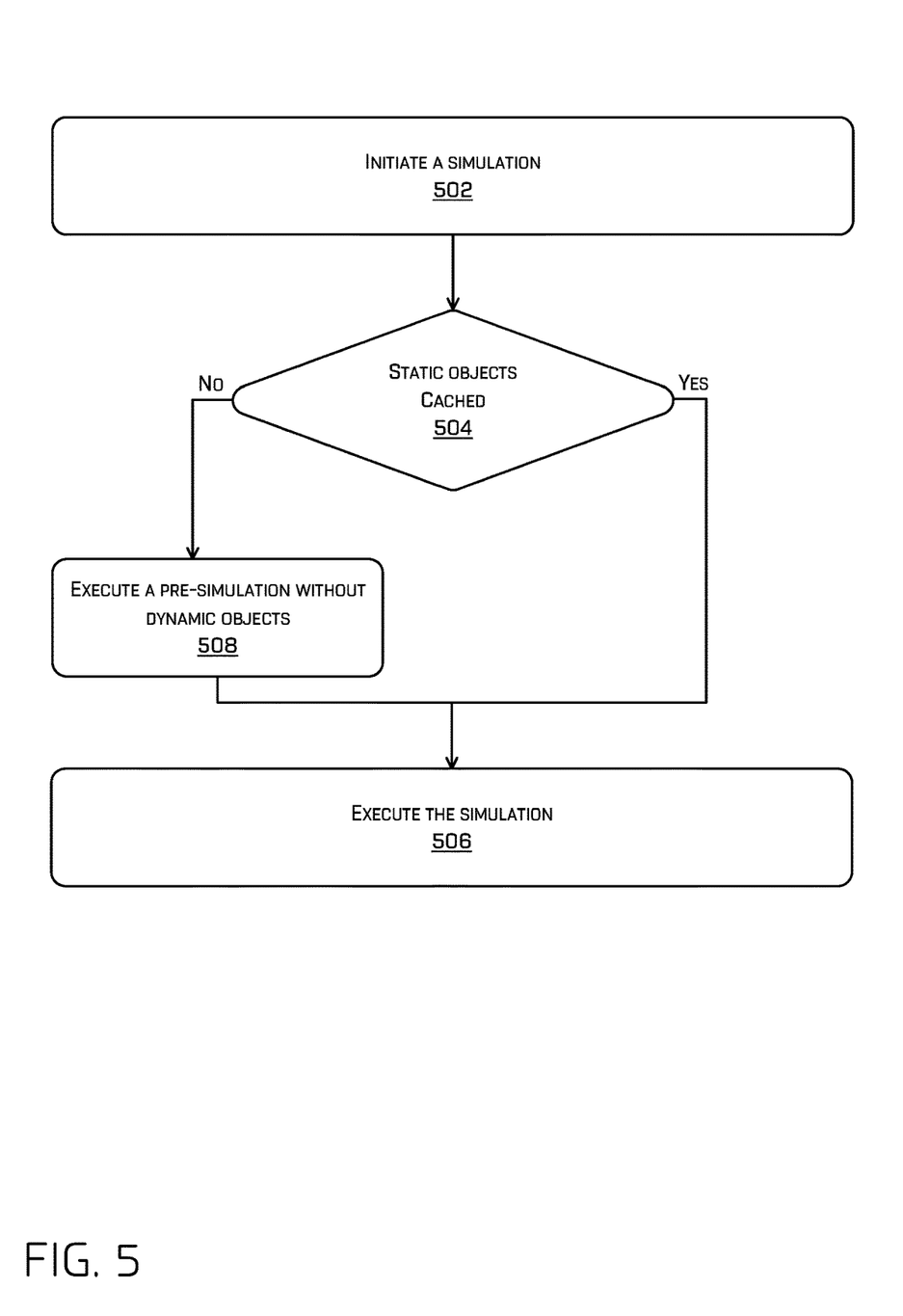
FIG. 5 is a flow diagram illustrating an example process associated with the pre-simulation component, in accordance with implementations of the disclosure.

FIG. 5 is a flow diagram illustrating an example process 500 associated with the pre-simulation component, in accordance with implementations of the disclosure. In some cases, the simulation system may, for each simulation instance, determine if the pre-simulation without dynamic objects should be executed. For example, the simulation system may determine if the static objects associated with the predicted route of a current scenario corresponds to the cached or stored occlusion data prior to initiating the simulation.

At 502, the simulation system may initiate a simulation. For example, the simulation may be associated with a scenario having a defined route, dynamic objects, and scene conditions and/or characteristics.

At 504, the simulation system may determine if the static objects associated with the route of the scenario are cached. For example, the simulation system may determine if the scenario is associated with a set of scenarios and if the scenario is the first of such scenarios. In other cases, the simulation system may compare the predicted route to the current cached static objects and detect any divergences. If the static objects are cached, the process 500 proceeds to 506 and the simulation system executes the simulation. However, if the static objects are not cached, the process 500 may first advance to 508.

At 508, the simulation system may execute a pre-simulation associated with the scenario without the presence of dynamic objects. During the pre-simulation, the simulation system may identify and store the position and characteristics of static objects (such as buildings, benches, plants, parked cars, and the like). The simulation system may also identify any gaps in the scene caused by occlusion within the sensor data of the log data used to generate the one or more scenarios and fill them in. In this manner, the simulation system may prevent issues and/or errors during testing caused by deviations between the virtual test vehicle and the operating vehicle that collected the log data, as discussed above.

Figure 6:
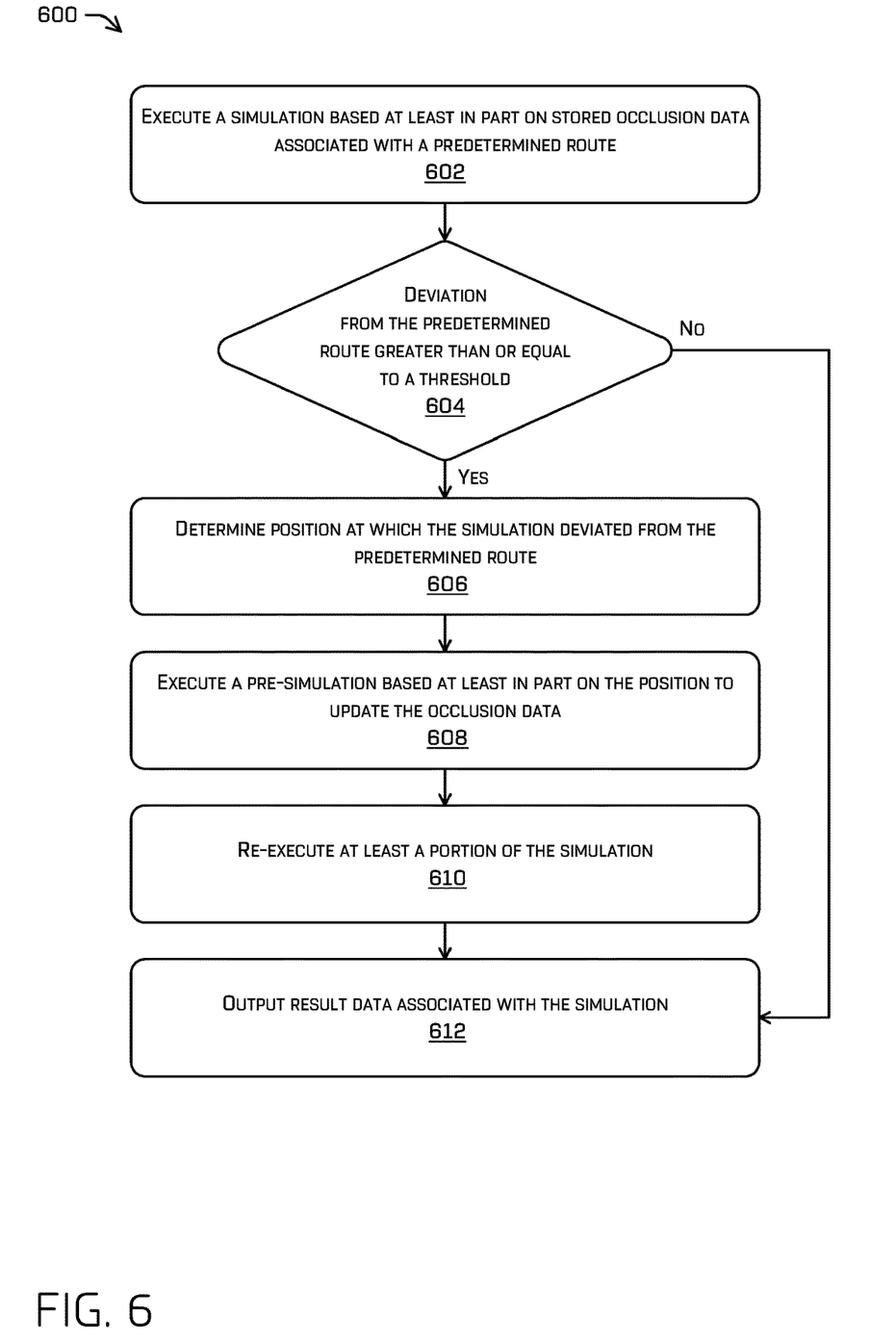
FIG. 6 is a flow diagram illustrating an example process associated with the pre-simulation component, in accordance with implementations of the disclosure.

FIG. 6 is a flow diagram illustrating an example process 600 associated with the pre-simulation component, in accordance with implementations of the disclosure. As discussed above, the simulation system may execute a pre-simulation scenario in order to cache occlusion data associated with static objects along a route. However, in some cases, the simulated vehicle may deviate from the predetermined route. In these cases, the simulation instance may be fully or partially discarded as the occlusion data may not represent the environment accurately along the deviated route. In some instances, the simulation system may generate a dense grid of the entire region or world represented by the simulated scene by running a plurality of pre-simulation events. In other cases, the system may discard the result data and re-execute at least a portion of the simulation as discussed below.

At 602, the simulation system may execute a simulation based at least in part on the stored occlusion data associated with the predetermined route. In some cases, the simulation system may reduce the computation complexity of the simulation by operating in a two-dimensional simulation based at least in part on the occlusion data and static object look up.

At 604, the simulation system may determine if the simulated vehicle has deviated from the predetermined route by greater than or equal to a resold. As the occlusion data is associated with the predetermined route, if the simulated vehicle deviated by greater than a predetermined threshold (such as turning down a side street), the simulation results may not be meaningful as the side street may lack associated occlusion data causing the vehicle to operate as if there were no static objects or obstructions. In this implementation, if the simulated vehicle remained on the predetermined path, the process 600 advances to 612 and the system outputs the result data associated with the simulation. Otherwise, the process 600 proceeds to 606.

At 606, the simulation system may determine a position at which the simulation deviated from the predetermined route. In some cases, the vehicle may deviate from the predetermined route at multiple positions. In these cases, the position may be the first position or time at which the simulated vehicle deviated. In other examples, the position may be associated with the vehicle deviating by more than the threshold. In some examples, the position may be the start of the simulation or the simulation may be discarded and rerun using the deviated path as the new predetermined path.

At 608, the simulation system may execute a pre-simulation based at least in part on position to update the occlusion data. In this example, the pre-simulation may be executed without the presence of dynamic objects and along the deviated path or the new predetermined path. The occlusion data along the deviated path or the new predetermined path may be stored.

At 610, the simulation system may re-execute at least a portion of the simulation. For example, the simulation system may execute the simulation from the beginning. In other examples, the simulation may commence from the position at which the simulated vehicle deviated from the original predetermined path.

At 612, the simulation system may then output the result data associated with the simulation and the simulation system may return to 602 and execute a subsequent simulation associated with the predetermined route until all simulations associated with the predetermined route are complete.

Figure 7:
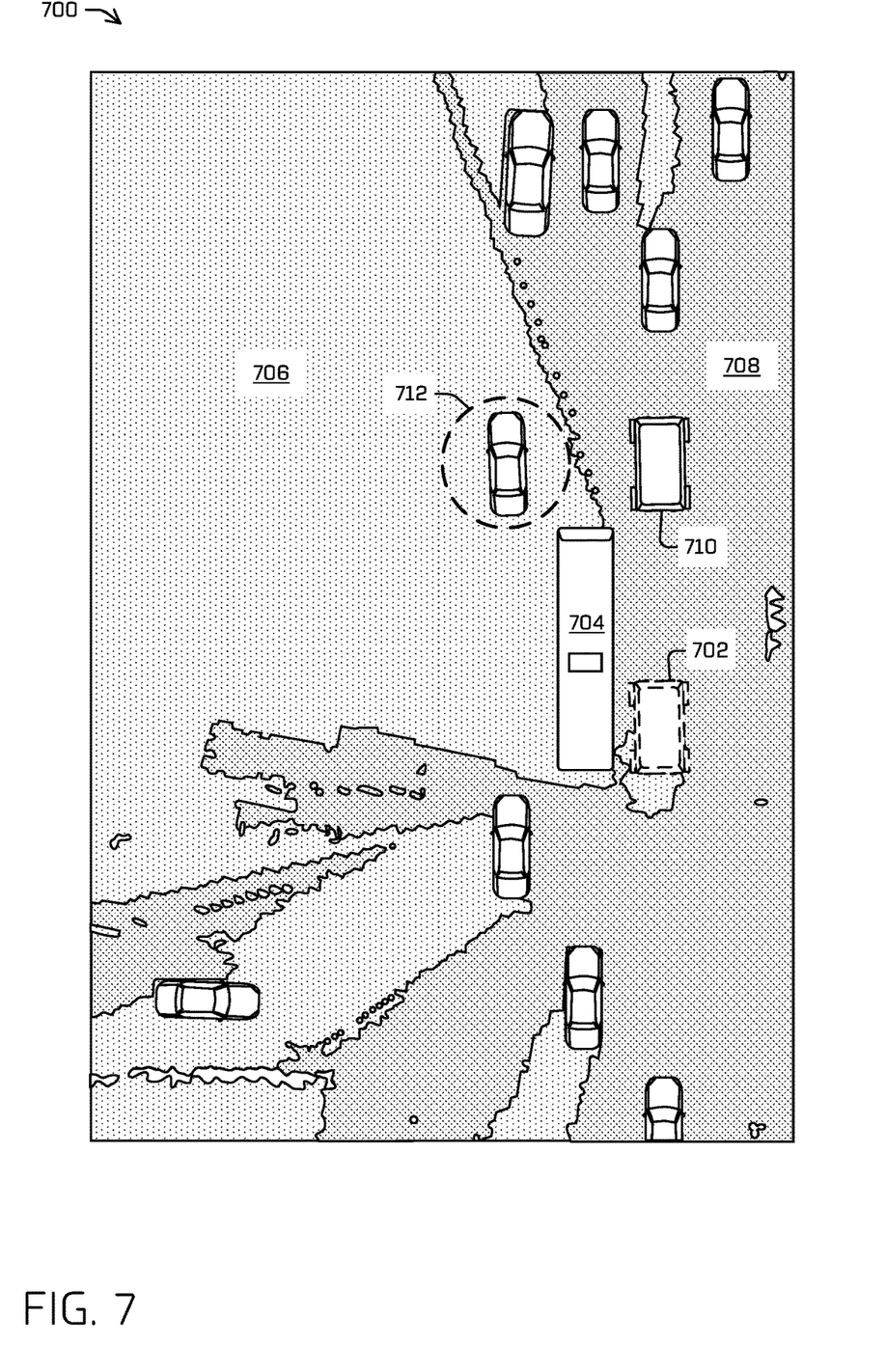
FIG. 7 is a pictorial diagram illustrating an occlusion in log data, in accordance with implementations of the disclosure.

FIG. 7 is a pictorial diagram 700 illustrating an occlusion in log data, in accordance with implementations of the disclosure. As illustrated, the scenario was generating using log data captured by an operating vehicle, generally indicated by 702, that was traveling adjacent to the bus 704. As a result, the log data includes an occluded region 706 and a visible region 708. However, at the currently illustrated time of the simulation instance, the simulated vehicle 710 may occupy a position ahead of the bus 704 and at least a portion of the occluded region 706 should be visible. Additionally, in this example, another object 712 (e.g., the car) is positioned within the occluded region 706. In conventional simulations, the object 712 may be ignored by the simulated vehicle 710 as the occluded region is treated as open or empty space. However, the simulation system, discussed herein, may utilize the pre-simulation to not only cache or store the occlusion data but to complete or fill the occluded region 706 with static objects for simulation purposes. For example, if the occluded region 706 had included an intersection with poor visibility (such as close by buildings and/or overhanging vegetation), the simulated vehicle 710 may preform differently than if the occluded region 706 is an empty field.

Figure 8:
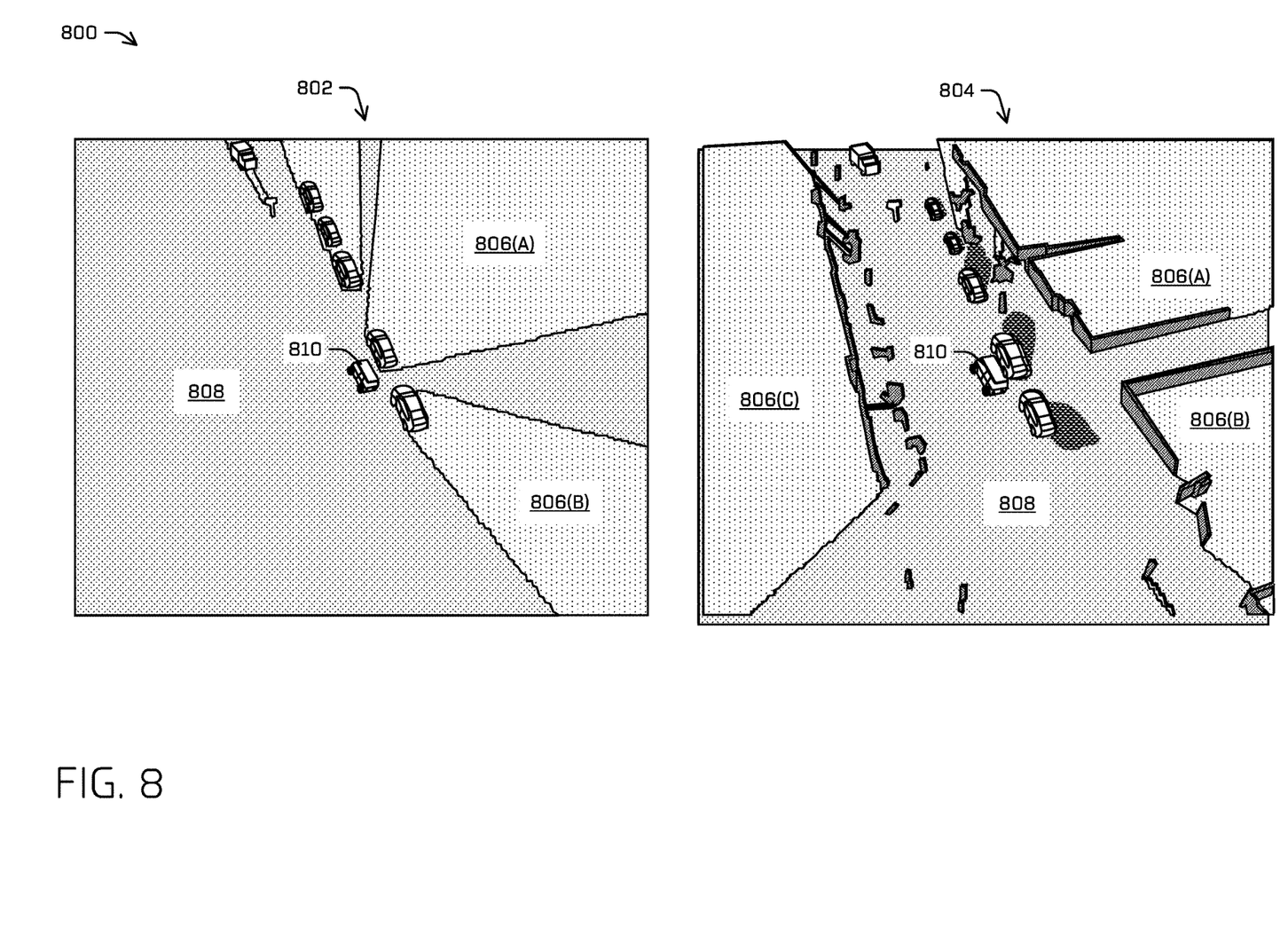
FIG. 8 is a pictorial diagram illustrating differences in simulations with and without static objects, in accordance with implementations of the disclosure.

FIG. 8 is a pictorial diagram 800 illustrating differences in simulations with and without static objects, in accordance with implementations of the disclosure. In the current example, a first version 802 and a second version 804 of a simulation instance is shown. The first version 802 is run with static objects removed while the second version 804 is run with the static objects present. Similar to FIG. 7, both the first version 802 and the second version 804 of the simulation instance includes occluded regions 806 and visible regions 808. However, as shown the visible region 808 in the first version 802 represents a larger portion of the physical environment than the visible region 808 in the second version 804, as the buildings along the edge of the street in the second version 804 obstruct the view of the vehicle 810 and may alter the results of the simulation instance as the vehicle may make different operational decisions based on the differences in occluded regions 806. Accordingly, the second version 704 having static objects filled, stored, and accessible at simulation time provides more realistic or more real life like test conditions as well as reduce and/or maintained processing times when compared with conventional simulations.

Figure 9:
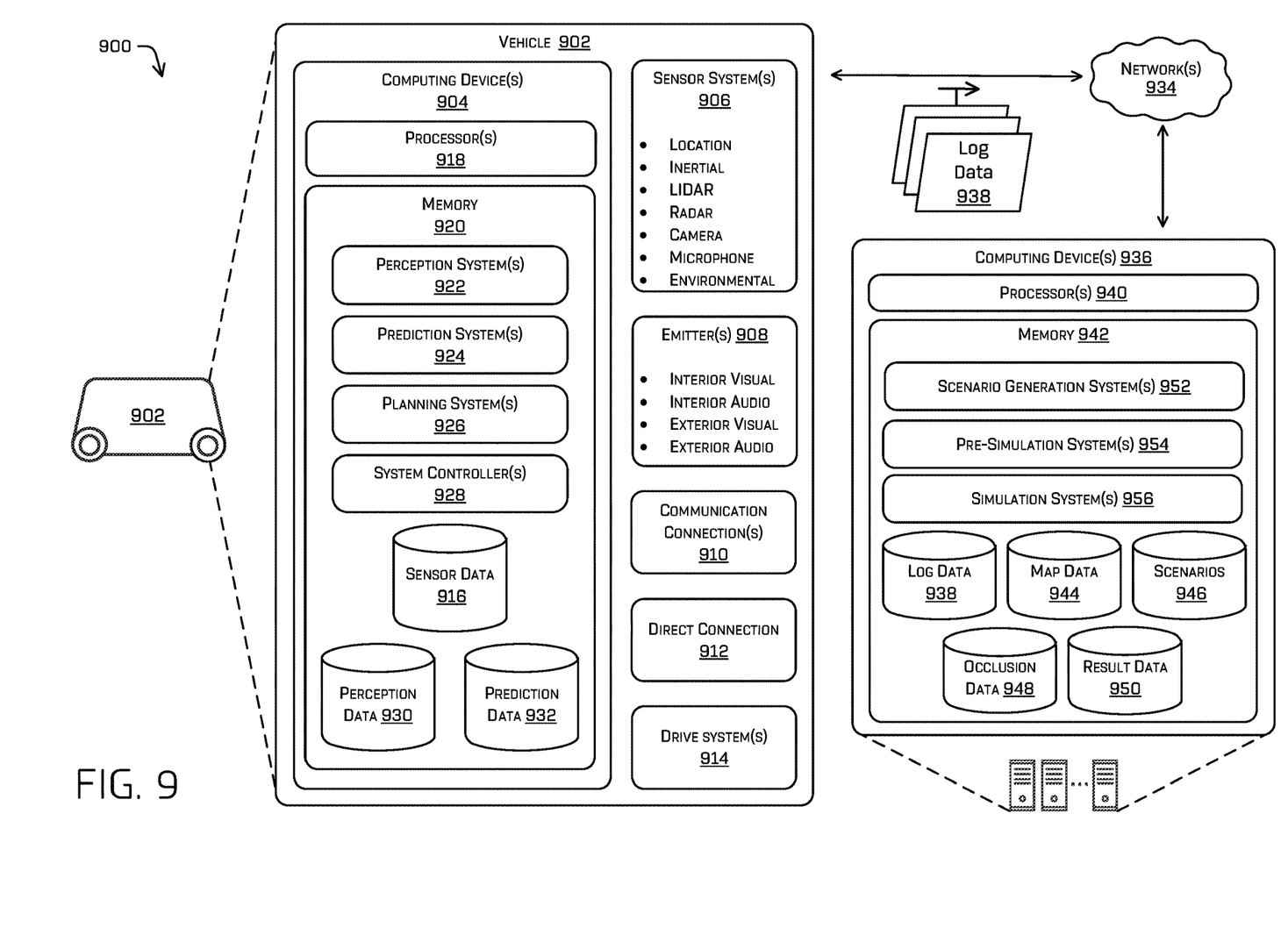
FIG. 9 depicts a block diagram of an example system for implementing the techniques discussed herein.

FIG. 9 depicts a block diagram of an example system 900 for implementing the techniques discussed herein. In at least one example, the system 900 may include a vehicle 902, such the autonomous vehicles discussed above. The vehicle 902 may include computing device(s) 904, one or more sensor system(s) 906, one or more emitter(s) 908, one or more communication connection(s) 910 (also referred to as communication devices and/or modems), at least one direct connection 912 (e.g., for physically coupling with the vehicle 902 to exchange data and/or to provide power), and one or more drive system(s) 914. The one or more sensor system(s) 906 may be configured to capture the sensor data 916 associated with a surrounding physical environment.

In at least some examples, the sensor system(s) 906 may include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. In some examples, the sensor system(s) 906 may include multiple instances of each type of sensors. For instance, time-of-flight sensors may include individual time-of-flight sensors located at the corners, front, back, sides, and/or top of the vehicle 902. As another example, camera sensors may include multiple cameras disposed at various locations about the exterior and/or interior of the vehicle 902. In some cases, the sensor system(s) 906 may provide input to the computing device(s) 904.

The vehicle 902 may also include one or more emitter(s) 908 for emitting light and/or sound. The one or more emitter(s) 908 in this example include interior audio and visual emitters to communicate with passengers of the vehicle 902. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 808 in this example also includes exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 902 can also include one or more communication connection(s) 910 that enables communication between the vehicle 902 and one or more other local or remote computing device(s) (e.g., a remote teleoperations computing device) or remote services. For instance, the communication connection(s) 910 can facilitate communication with other local computing device(s) on the vehicle 902 and/or the drive system(s) 914. Also, the communication connection(s) 910 may allow the vehicle 902 to communicate with other nearby computing device(s) (e.g., other nearby vehicles, traffic signals, etc.).

The communications connection(s) 910 may include physical and/or logical interfaces for connecting the computing device(s) 904 to another computing device or one or more external network(s) 934 (e.g., the Internet). For example, the communications connection(s) 910 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s). In at least some examples, the communication connection(s) 910 may comprise the one or more modems as described in detail above.

In at least one example, the vehicle 902 may include one or more drive system(s) 914. In some examples, the vehicle 902 may have a single drive system 914. In at least one example, if the vehicle 902 has multiple drive systems 914, individual drive systems 914 may be positioned on opposite ends of the vehicle 902 (e.g., the front and the rear, etc.). In at least one example, the drive system(s) 914 can include one or more sensor system(s) 906 to detect conditions of the drive system(s) 914 and/or the surroundings of the vehicle 902. By way of example and not limitation, the sensor system(s) 906 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 914. In some cases, the sensor system(s) 906 on the drive system(s) 914 can overlap or supplement corresponding systems of the vehicle 902 (e.g., sensor system(s) 906).

The drive system(s) 914 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 914 can include a drive system controller which may receive and preprocess data from the sensor system(s) 906 and control operation of the various vehicle systems. In some examples, the drive system controller can include one or more processor(s) and memory communicatively coupled with the one or more processor(s). The memory can store one or more modules to perform various functionalities of the drive system(s) 914. Furthermore, the drive system(s) 914 also include one or more communication connection(s) that enable communication by the respective drive system with one or more other local or remote computing device(s).

The computing device(s) 904 may include one or more processors 918 and one or more memories 920 communicatively coupled with the processor(s) 918. In the illustrated example, the memory 920 of the computing device(s) 904 stores perception system(s) 922, prediction system(s) 924, planning system(s) 926, as well as one or more system controller(s) 928. The memory 920 may also store data such as sensor data 916 captured or collected by the one or more sensors systems 906, perception data 930 associated with the processed (e.g., categorized and segmented) sensor data 916, prediction data 932 associated with one or more predicted state of the environment and/or detected objects within the environment. Though depicted as residing in the memory 920 for illustrative purposes, it is contemplated that the perception system(s) 922, prediction system(s) 924, planning system(s) 926, as well as one or more system controller(s) 928 may additionally, or alternatively, be accessible to the computing device(s) 904 (e.g., stored in a different component of vehicle 902 and/or be accessible to the vehicle 902 (e.g., stored remotely).

The perception system 922 may be configured to perform object detection, segmentation, and/or category on the sensor data 916. In some examples, the perception system 922 may generate processed perception data 930 from the sensor data 916. The perception data 930 may indicate a presence of objects that are in physical proximity to the vehicle 902 and/or a classification or type of the objects (e.g., car, pedestrian, cyclist, building, tree, road surface, curb, sidewalk, unknown, etc.). In additional and/or alternative examples, the perception system 922 may generate or identify one or more characteristics associated with the objects and/or the physical environment. In some examples, characteristics associated with the objects may include, but are not limited to, an x-position, a y-position, a z-position, an orientation, a type (e.g., a classification), a velocity, a size, a direction of travel, etc. Characteristics associated with the environment may include, but are not limited to, a presence of another object, a time of day, a weather condition, a geographic position, an indication of darkness/light, etc. For example, details of classification and/or segmentation associated with a perception system are discussed in U.S. application Ser. No. 15/820,245 entitled "Sensor Data Segmentation", which is herein incorporated by reference in its entirety for all purposes. The prediction system 824 may be configured to determine a track corresponding to an object identified by the perception system 922. For example, the prediction system 924 may be configured to predict a velocity, position, change in trajectory, or otherwise predict the decisions and movement of the identified objects. For example, the prediction system 924 may include one or more machine learned models that may, based on inputs such as object type or classification and object characteristics, output predicted characteristics of the object at one or more future points in time. For example, details of predictions systems are discussed in U.S. application Ser. Nos. 16/246,208 entitled "Occlusion Prediction and Trajectory Evaluation" and 16/420,050 entitled "Trajectory Prediction on Top-Down Scenes and Associated Model", which are herein incorporated by reference in their entirety for all purposes.

The planning system 926 may be configured to determine a route for the vehicle 902 to follow to traverse through an environment. For example, the planning system 926 may determine various routes and paths and various levels of detail based at least in part on the objects detected, the predicted characteristics of the object at future times, and a set of safety requirements corresponding to the current scenario (e.g., combination of objects detected and/or environmental conditions). In some instances, the planning system 826 may determine a route to travel from a first location (e.g., a current location) to a second location (e.g., a target location) in order to avoid an object obstructing or blocking a planned path of the vehicle 902. In some case, a route can be a sequence of waypoints for traveling between the two locations (e.g., the first location and the second location). In some cases, waypoints include streets, intersections, global positioning system (GPS) coordinates, etc. For example, details of path and route planning by the planning system are discussed in U.S. application Ser. Nos. 16/805,118 entitled "System and Method for Adjusting a Planned Trajectory of an Autonomous Vehicle" and 15/632,208 entitled "Trajectory Generation and Execution Architecture", which are each herein incorporated by reference, in their entirety and for all purposes.

In at least one example, the computing device(s) 904 may store one or more and/or system controllers 928, which may be configured to control steering, propulsion, braking, safety, emitters, communication, and other systems of the vehicle 902. The system controllers 928 may communicate with and/or control corresponding systems of the drive system(s) 914 and/or other components of the vehicle 902, which may be configured to operate in accordance with a route provided from the planning system 926.

In some implementations, the vehicle 902 may connect to computing device(s) 936 via the network(s) 934. For example, the computing device(s) 836 may receive log data 938 from one or more vehicles 902. The log data 938 may include the sensor data, perception data, prediction data and/or a combination thereof. In some cases, the log data 938 may include portions of one or more of the sensor data, perception data, prediction data.

The computing device 836 may include one or more processors 940 and memory 942 communicatively coupled with the one or more processors 940. In at least one instance, the processor(s) 940 may be similar to the processor(s) 918 and the memory 942 may be similar to the memory 920. In the illustrated example, the memory 942 of the computing device(s) 936 stores the log data 938 received from one or more vehicles 902. The memory 942 may also store map data 944, scenarios 946, occlusion data 948, and result data 950, as described above. The memory 942 may also store a scenario generation system 952, pre-simulation system 954, and simulation system 956.

The scenario generation system 952 may utilize parameters or states of objects extracted from the log data 938 to generate the simulation scenarios 946. In some examples, the scenario generation system 952 may be configured to receive as an input or otherwise access the map data 944 of actual roads and physical environments. The scenario generation system 952 may then fit the scenarios 946 and/or arranged representative objects based on corresponding parameters (velocity, distance from the vehicle, associated region, direction of travel or trajectory, etc.) to the map data 944, such that the scenario 946 are determined feasible at the selected map location or environment. In other examples, the scenario generation system 952 may generate the scenarios 846 without relying on log data 938. For example, the scenarios and/or parameters of the scenarios may be generated synthetically. In some cases, the scenarios 946 (either based at least in part on the log data 938 and/or generated synthetically) may be fit to the map data 944, such that in some cases some scenarios 946 may be generated without relying on either the log data 938 or the map data 944.

The pre-simulation system 954 may receive the scenarios 846 or the set of scenarios along a given route. The pre-simulation system 954 may execute a single simulation instance without the presence of dynamic objects to detect and store (e.g., cache) occlusion data 948 along the route. In some examples, the pre-simulation system 954 may execute less than a predetermined threshold number of simulation instances associated with the set of scenarios, in the cases in which the vehicle may have multiple routes to choose from (e.g., one instance for each potential route). In some cases, the pre-simulation system 954 may also detect gaps or holes in the scene associated with the scenarios 946 and fill the holes with various generated static objects. These static objects may also be included in the occlusion data 848. The simulation system 856 may receive or access the scenarios 946 in order to generate and execute simulation instances of various components and software of autonomous vehicles in order to capture or generate result data 950. For example, the scenario 946 data may be used by the simulation system 956 to simulate variations of the desired situation represented by the scenario criterion. For example, the simulation system 956 may execute a variation of the vectorized scenario data in a simulation for testing and validation. The simulation system 956 may also generate result data 950 indicating how the tested autonomous vehicle performed (e.g., responded) and may compare the result data 950 to a predetermined outcome and/or determine if any predetermined rules/assertions were broken/triggered.

In some examples, the pre-simulation system 954 may also generate occupancy grids as discussed above. In some cases, the occupancy grid may be utilized during the subsequent simulations performed by the simulation system 956 to determine when a dynamic object has entered an occluded area (e.g., is invisible to the vehicle being tested). In some examples, the occlusion grid may include characteristics or features of the occlusion and/or occluding object, such as height of occluding object, transparency of the occluding object, solidity of the occluding object, and the like. In this manner, the simulation system 856 may utilize the characteristics stored in the occlusion grid together with data known about the sensor systems of the vehicle and the dynamic objects to determine if nearby dynamic objects are occluded. For example, if the dynamic object has a height greater than the occluding object, the dynamic object may remain visible even though it has entered an occluded area at which a shorter dynamic object would be invisible.

The processor(s) 918 of the computing device(s) 804 and the processor(s) 940 of the computing device(s) 936 may be any suitable processor capable of executing instructions to process data and perform operations as described herein. By way of example and not limitation, the processor(s) 918 and 940 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 920 of the computing device(s) 904 and the memory 942 of the computing device(s) 936 are examples of non-transitory computer-readable media. The memory 920 and 942 can store an operating system and one or more software applications, instructions, programs, and/or data to implement the methods described herein and the functions attributed to the various systems. In various implementations, the memory 820 and 842 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine learning algorithms. For example, in some instances, the components in the memory 820 and 842 can be implemented as a neural network.

CONCLUSION

While one or more examples of the techniques described herein have been described, various alterations, additions, permutations and equivalents thereof are included within the scope of the techniques described herein. As can be understood, the components discussed herein are described as divided for illustrative purposes. However, the operations performed by the various components can be combined or performed in any other component. It should also be understood, that components or steps discussed with respect to one example or implementation may be used in conjunction with components or steps of other examples. For example, the components and instructions of FIG. 9 may utilize the processes and flows of FIGS. 1-8.

A non-limiting list of objects or agents may include obstacles in an environment, including but not limited to pedestrians, animals, cyclists, trucks, motorcycles, other vehicles, or the like. Such objects in the environment have a "geometric pose" (which may also be referred to herein as merely "pose") comprising a location and/or orientation of the overall object relative to a frame of reference. In some examples, pose may be indicative of a position of an object (e.g., pedestrian), an orientation of the object, or relative appendage positions of the object. Geometric pose may be described in two-dimensions (e.g., using an x-y coordinate system) or three-dimensions (e.g., using an x-y-z or polar coordinate system), and may include an orientation (e.g., roll, pitch, and/or yaw) of the object. Some objects, such as pedestrians and animals, also have what is referred to herein as "appearance pose." Appearance pose comprises a shape and/or positioning of parts of a body (e.g., appendages, head, torso, eyes, hands, feet, etc.). As used herein, the term "pose" refers to both the "geometric pose" of an object relative to a frame of reference and, in the case of pedestrians, animals, and other objects capable of changing shape and/or positioning of parts of a body, "appearance pose." In some examples, the frame of reference is described with reference to a two- or three-dimensional coordinate system or map that describes the location of objects relative to a vehicle. However, in other examples, other frames of reference may be used.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

EXAMPLE CLAUSES

A. An system comprising: one or more processors; and one or more non-transitory computer-readable media storing instructions that, when executed by the one or more processors, cause the one or more processors to perform operations comprising: receiving log data associated with a vehicle, the log data representing an environment traversed by the vehicle; determining, based on the log data, one or more static objects in the environment; determining, based on the log data, one or more dynamic objects in the environment; executing a pre-simulation scenario, the pre-simulation scenario including a vehicle and the one or more static objects and excluding the one or more dynamic objects; determining, based on the vehicle in the pre-simulation scenario and the one or more static objects in the pre-simulation scenario, an occluded area in the pre-simulation scenario; storing, as results data, the occluded area associated with the pre-simulation scenario; and outputting the results data for use by additional simulations including the occluded area.

B. The system of claim A, wherein the pre-simulation scenario is executed in a three-dimensional environment.

C. The system of claim A, wherein the operations further comprising generating the pre-simulation scenario without the dynamic objects.

D. The system of claim A, the operations further comprising filling the occluded area with synthetic scene data.

E. A method comprising: determining an environment to be simulated in a vehicle simulation; determining one or more static objects in the environment; executing a pre-simulation scenario including the one or more static objects, the pre-simulation scenario including a vehicle; determining an area occluded from the vehicle in the pre-simulation scenario based on the one or more static objects; storing occluded area data indicating the area occluded from the vehicle; and providing the occluded area data to a simulated scenario.

F. The method of paragraph E, further comprising: receiving data representing the environment to be simulated; and generating a plurality of simulation scenarios based at least in part on the data.

G. The method of paragraph E, further comprising: receiving map data associated with the environment to be simulated; and generating a plurality of simulation scenarios based at least in part on the map data.

H. The method of paragraph E, wherein the pre-simulation scenario is executed without a presence of dynamic objects.

I. The method of paragraph E, wherein the simulated scenario comprises dynamic objects.

J. The method of paragraph E, further comprising filling the area occluded from the vehicle with synthetic data.

K. The method of paragraph E, wherein filling the area occluded from the vehicle with synthetic data is based at least in part on real physical object data, procedurally generated object data, random object data, and/or generalized object data.

L. The method of paragraph E, wherein storing occluded area data further comprises generating a grid and wherein the occluded area data is stored with respect to a corresponding position of the grid.

M. The method of paragraph E, wherein the occluded area data comprises data associated with a first object, the data associated with the first object comprising at least one of: a height of the first object; a percentage of occlusion caused by the first object; a class of the first object; a bounding box associated with the first object; and one or more features of the first object.

N. A non-transitory computer-readable medium storing instructions that, when executed, cause one or more processors to perform operations comprising: determining an environment to be simulated in a vehicle simulation; determining one or more static objects in the environment; executing a pre-simulation scenario including the one or more static objects, the pre-simulation scenario including a vehicle; determining an area occluded from the vehicle in the pre-simulation scenario based on the one or more static objects; storing occluded area data indicating the area occluded from the vehicle; and providing the occluded area data to a simulated scenario.

O. The non-transitory computer-readable medium of paragraph N, wherein that occluded area data is occlusion data and the pre-simulation scenario is executed without a presence of dynamic objects.

P. The non-transitory computer-readable medium of paragraph O, wherein storing occluded area data further comprises generating a grid and wherein the occluded area data is stored with respect to a corresponding position of the grid.

Q. The non-transitory computer-readable medium of paragraph N, wherein the occluded area data comprises data associated with a first object, the data associated with the first object comprising at least one of: a height of the first object; a percentage of occlusion caused by the first object; a class of the first object; a boundary associated with the first object; and one or more features of the first object.

R. The non-transitory computer-readable medium of paragraph N, wherein the operations further comprise: receiving log data associated with a physical vehicle, the log data representing an environment traversed by the physical vehicle; and generating a plurality of simulation scenarios based at least in part on the log data.

S. The non-transitory computer-readable medium of paragraph N, wherein the operations further comprise: receiving map data associated with the environment to be simulated; and wherein generating a plurality of simulation scenarios based at least in part on the map data.

T. The non-transitory computer-readable medium of paragraph N, wherein the operations further comprise filling the area occluded from the vehicle with synthetic data.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

What is claimed is:
1. A system comprising:
one or more processors; and
one or more non-transitory computer-readable media storing instructions that, when executed by the one or more processors, cause the one or more processors to perform operations comprising:
receiving log data associated with a vehicle, the log data representing an environment traversed by the vehicle;
determining, based on the log data, one or more static objects in the environment;

determining, based on the log data, one or more dynamic objects in the environment;

executing a pre-simulation scenario, the pre-simulation scenario including a vehicle and the one or more static objects and excluding the one or more dynamic objects;

determining, based on the vehicle in the pre-simulation scenario and the one or more static objects in the pre-simulation scenario, an occluded area in the pre-simulation scenario;

storing, as results data, the occluded area associated with the pre-simulation scenario; and outputting the results data for use by additional simulations including the occluded area.

2. The system as recited in claim 1, wherein the pre-simulation scenario is executed in a three-dimensional environment and comprises simulating operations of the vehicle within the environment to be simulated.

3. The system as recited in claim 1, wherein the operations further comprising generating the pre-simulation scenario without the dynamic objects.

4. The system as recited in claim 1, operations further comprising filling the occluded area with synthetic scene data.

5. A method comprising:
determining an environment to be simulated in a vehicle simulation;
determining one or more static objects in the environment;
executing a pre-simulation scenario including the one or more static objects, the pre-simulation scenario including a vehicle;
determining an area occluded from the vehicle in the pre-simulation scenario based on the one or more static objects;
storing occluded area data indicating the area occluded from the vehicle; and
providing the occluded area data to a simulated scenario.

6. The method as recited in claim 5, further comprising:
receiving data representing the environment to be simulated; and
generating a plurality of simulation scenarios based at least in part on the data.

7. The method as recited in claim 5, further comprising:
receiving map data associated with the environment to be simulated; and
generating a plurality of simulation scenarios based at least in part on the map data, individual ones of the plurality of simulation scenarios including differing dynamic objects.

8. The method as recited in claim 5, wherein the pre-simulation scenario is executed without a presence of dynamic objects.

9. The method as recited in claim 5, wherein the simulated scenario comprises dynamic objects and wherein the pre-simulation scenario comprises simulating operations of the vehicle within the environment to be simulated.

10. The method as recited in claim 5, further comprising filling the area occluded from the vehicle with synthetic data.

11. The method as recited in claim 10, wherein filling the area occluded from the vehicle with synthetic data is based at least in part on real physical object data, procedurally generated object data, random object data, and/or generalized object data.

12. The method as recited in claim 5, wherein storing occluded area data further comprises generating a grid and wherein the occluded area data is stored with respect to a corresponding position of the grid.

13. The method as recited in claim 5, wherein the simulated scenario is a first simulated scenario of a plurality of simulated scenarios, the plurality of simulated scenarios including a second simulated scenario and the method further comprises:
executing a first simulation based at least in part on the first simulated scenario and the occluded area data; and
executing a second simulation based at least in part on the second simulated scenario and the occluded area data.

14. One or more non-transitory computer-readable media storing instructions that, when executed, cause one or more processors to perform operations comprising:
determining an environment to be simulated in a vehicle simulation;
determining one or more static objects in the environment;
executing a pre-simulation scenario including the one or more static objects, the pre-simulation scenario including a vehicle;
determining an area occluded from the vehicle in the pre-simulation scenario based on the one or more static objects;
storing occluded area data indicating the area occluded from the vehicle; and
providing the occluded area data to a simulated scenario.

15. The one or more non-transitory computer-readable media as recited in claim 14, wherein that occluded area data is occlusion data and the pre-simulation scenario is executed without a presence of dynamic objects.

16. The one or more non-transitory computer-readable media as recited in claim 15, wherein storing occluded area data further comprises generating a grid and wherein the occluded area data is stored with respect to a corresponding position of the grid.

17. The one or more non-transitory computer-readable media as recited in claim 14, wherein the occluded area data comprises data associated with a first object, the data associated with the first object comprising at least one of:
a height of the first object;
a percentage of occlusion caused by the first object;
a class of the first object;
a boundary associated with the first object; and
one or more features of the first object.

18. The one or more non-transitory computer-readable media as recited in claim 14, wherein the operations further comprise:
receiving log data associated with a physical vehicle, the log data representing an environment traversed by the physical vehicle; and
generating a plurality of simulation scenarios based at least in part on the log data.

19. The one or more non-transitory computer-readable media as recited in claim 14, wherein the operations further comprise:
receiving map data associated with the environment to be simulated; and
wherein generating a plurality of simulation scenarios based at least in part on the map data.

20. The one or more non-transitory computer-readable media as recited in claim 14, wherein the operations further comprise filling the area occluded from the vehicle with synthetic data.

* * * * *